Patented June 17, 1930

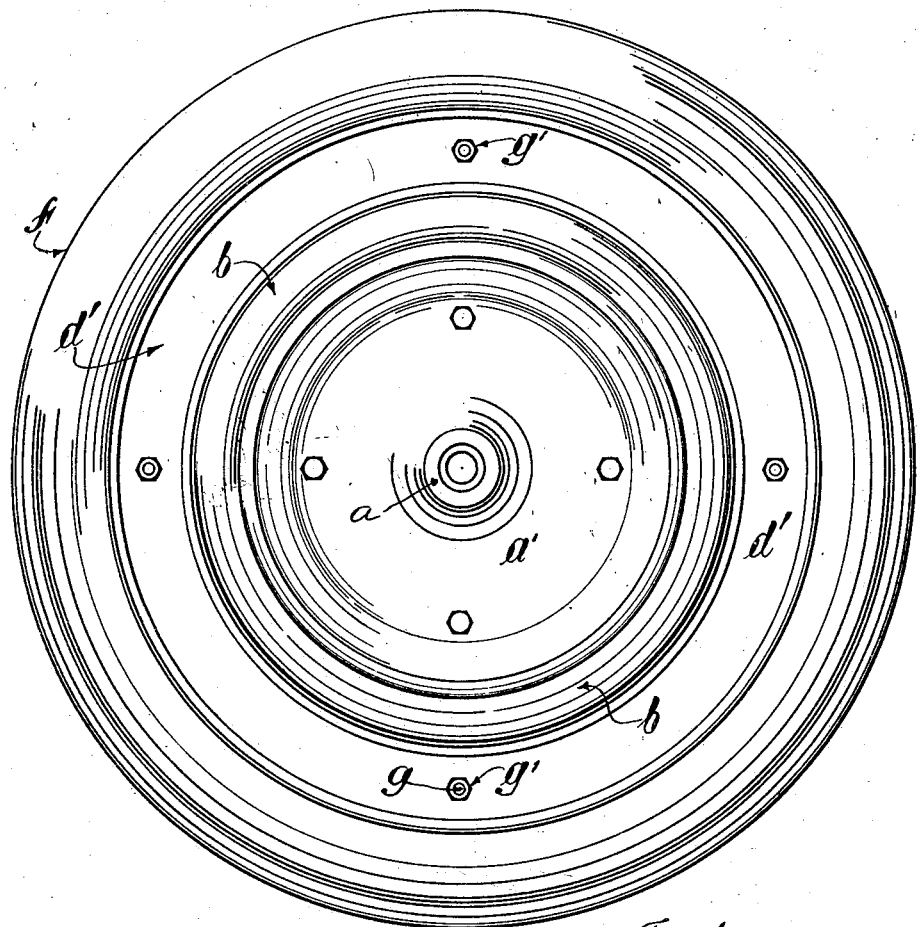
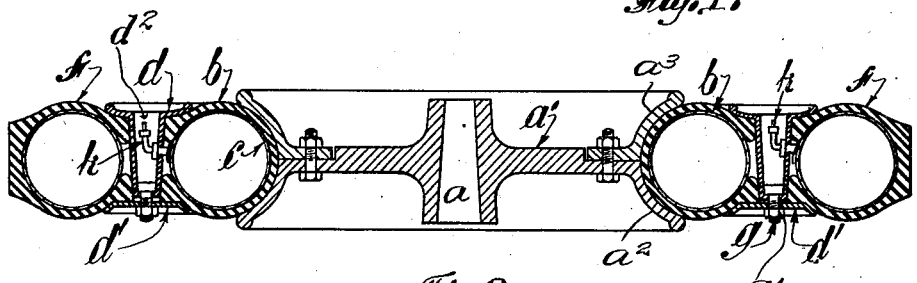

1,765,160

UNITED STATES PATENT OFFICE

ALFRED JAMES JOHNSEN, OF DURBAN, SOUTH AFRICA

SPRING WHEEL FOR VEHICLES

Application filed October 27, 1928, Serial No. 315,535, and in Great Britain July 31, 1928.

This invention relates to wheels for road vehicles of the kind comprising a central hub portion, two pneumatic tyres, one encircling the other, the closed portion of the inner tyre fitting on to the hub portion, and an intermediate rim separating the two tyres.

The object of the invention is an improved construction of intermediate rim whereby the rim and tyres can be more easily applied and removed than the rim and tyres of the known wheel.

Upon the accompanying drawings,

Fig. 1 is a side elevation, and

Fig. 2 a sectional plan of a vehicle wheel constructed according to the invention.

In the drawing, the wheel comprises a hub $a$, a web or plate-like part $a^1$ in one with the hub, and at its periphery having an annular flange $a^2$ of segmental cross section, a further annular and segmental flange $a^3$ and means for detachably connecting the same to the said web or plate-like part $a^1$, a pneumatic tyre comprising cover $b$ and inner tube $c$ in the two-part rim formed by the two annular and segmental flanges $a^2$, $a^3$, a further two-part metal rim $d$, $d'$ surrounding said tyre $b$ and a further pneumatic tyre $f$ surrounding said further rim, the closed side of the inner tyre lying next the rim parts $a^2$, $a^3$ and the closed side of the tyre $f$ lying furthest from the rim $d$, $d'$ or in other words, the covers of both tyres being arranged with their beaded edges next the rim $d$, $d'$.

The rim $d$, $d'$ is substantially H section, with one flange $d^1$ made detachable. The intermediate web or body of the rim lying between the tyres is of V or tapered cross section, and at intervals said web or body part is provided with holes $d^2$ and with short bolts $g$ by which and nuts $g^1$ the two-parts of the rim may be connected together. Into the holes project the valves $k$ of the tyres.

With the tyre $b$ properly inflated, the rim $d$, $d'$ is held firmly in position relatively to the hub $a$, and forms the desired elastic support for the outer tyre $f$ the rim being free to move.

By making the web part of the rim $d$, $d'$ of tapered cross section, it allows of the tyres being readily applied and removed, and with the tyres arranged with their valves in the rim $d$, the two tyres and rim $d$, $d'$ can be removed bodily from the wheel hub without the necessity of any valve disconnections from the wheel hub.

What I claim is:

In a spring wheel for vehicles of the kind comprising two pneumatic tyres, one encircling the other, and the inner one carried by the central part of the wheel, a rim intermediate of the tyres in the form of two annular plate-like parts and one part having a hollow and conical web portion extending at right angles to a point near the other part, and bolts and nuts for adjustably connecting the parts together and causing them to grip the tyres between them, the closed side of the inner tyre lying next the central part of the wheel, and the beaded edges of both tyres lying next the conical connecting member of the intermediate rim, as set forth.

In testimony whereof I have signed my name to this specification.

ALFRED JAMES JOHNSEN.